(12) United States Patent
Ernst et al.

(10) Patent No.: US 10,850,981 B2
(45) Date of Patent: Dec. 1, 2020

(54) METHODS OF PRODUCING A GAS AT A VARIABLE RATE

(71) Applicant: ICA TriNova, LLC, Newnan, GA (US)

(72) Inventors: William Ernst, Roswell, GA (US); Thomas Isaac, Newnan, GA (US)

(73) Assignee: ICA TriNova, LLC, Newnan, GA (US)

(*) Notice: Subject to any disclaimer, the term of this patent is extended or adjusted under 35 U.S.C. 154(b) by 85 days.

(21) Appl. No.: 15/960,896

(22) Filed: Apr. 24, 2018

(65) Prior Publication Data

US 2018/0305209 A1 Oct. 25, 2018

Related U.S. Application Data

(60) Provisional application No. 62/489,716, filed on Apr. 25, 2017.

(51) Int. Cl.
*C01B 11/02* (2006.01)
*C01B 32/50* (2017.01)

(52) U.S. Cl.
CPC .......... *C01B 11/024* (2013.01); *C01B 11/022* (2013.01); *C01B 11/023* (2013.01); *C01B 32/50* (2017.08)

(58) Field of Classification Search
CPC .... C01B 11/022; C01B 11/023; C01B 11/024
See application file for complete search history.

(56) References Cited

U.S. PATENT DOCUMENTS

| 2,163,793 A | 6/1939 | Ogden |
| 2,482,891 A | 9/1949 | Aston |
| 2,885,368 A | 5/1959 | Hess et al. |
| 3,049,399 A | 8/1962 | Gamson et al. |
| 3,271,242 A | 9/1966 | Mcnicholas |
| 3,298,780 A | 1/1967 | Fleck |
| 3,382,033 A | 5/1968 | Tetsuzo |

(Continued)

FOREIGN PATENT DOCUMENTS

| CN | 1820607 A | 8/2006 |
| CN | 100387518 C | 5/2008 |

(Continued)

OTHER PUBLICATIONS

Brickhouse, et al., "Effects of Vapor-Based Decontamination Systems on Selected Building Interior Materials: Chlorine Dioxide", EPA/600/R-08/054. Apr. 2008.

(Continued)

*Primary Examiner* — Ngoc-Yen Nguyen
(74) *Attorney, Agent, or Firm* — Meunier Carlin & Curfman LLC

(57) ABSTRACT

Disclosed herein are methods of producing a gas at a variable rate, the methods comprising dynamically mixing dry particles comprising a precursor and dry particles comprising a proton-generating species to produce a gas and wherein the gas is produced at a rate that is varied by varying the amount of time the dry particles comprising the precursor and the dry particles comprising the proton-generating species are dynamically mixed, the rate at which the dry particles comprising the precursor and the dry particles comprising the proton-generating species are dynamically mixed, or a combination thereof.

13 Claims, 5 Drawing Sheets

(56) References Cited

U.S. PATENT DOCUMENTS

| | | |
|---|---|---|
| 3,591,515 A | 7/1971 | Lovely |
| 3,997,462 A | 12/1976 | Denaeyer et al. |
| 4,247,531 A | 1/1981 | Hicks |
| 4,362,753 A | 12/1982 | Barta et al. |
| 4,384,972 A | 5/1983 | Nakamura et al. |
| 4,528,171 A | 7/1985 | Casci et al. |
| 4,547,381 A | 10/1985 | Mason et al. |
| 4,554,261 A | 11/1985 | Gergely et al. |
| 4,581,219 A | 4/1986 | Imada et al. |
| 4,585,482 A | 4/1986 | Tice et al. |
| 4,590,057 A | 5/1986 | Hicks |
| 4,689,169 A | 8/1987 | Mason et al. |
| 4,695,296 A | 9/1987 | Christe |
| 4,731,193 A | 3/1988 | Mason et al. |
| 4,815,092 A | 3/1989 | Chartier |
| 4,871,701 A | 10/1989 | Danner et al. |
| 4,889,654 A | 12/1989 | Mason et al. |
| 5,008,096 A | 4/1991 | Ringo |
| 5,078,908 A | 1/1992 | Ripley et al. |
| 5,110,580 A | 5/1992 | Rosenblatt et al. |
| 5,246,622 A | 9/1993 | Shimizu et al. |
| 5,264,227 A | 11/1993 | Laroche et al. |
| 5,278,112 A | 1/1994 | Klatte et al. |
| 5,302,354 A | 4/1994 | Watvedt et al. |
| 5,306,440 A | 4/1994 | Ripley et al. |
| 5,314,852 A | 5/1994 | Klatte |
| 5,346,876 A | 9/1994 | Ichimura et al. |
| 5,360,609 A | 11/1994 | Wellinghoff |
| 5,376,164 A | 12/1994 | Zarchy et al. |
| 5,407,656 A | 4/1995 | Roozdar |
| 5,458,743 A | 10/1995 | Allen |
| 5,464,598 A | 11/1995 | Klatte et al. |
| 5,567,405 A | 10/1996 | Biswell et al. |
| 5,573,743 A | 11/1996 | Klatte et al. |
| 5,631,300 A | 5/1997 | Wellinghoff |
| 5,639,295 A | 6/1997 | Wellinghoff et al. |
| 5,668,185 A | 9/1997 | Wellinghoff |
| 5,707,739 A | 1/1998 | Wellinghoff et al. |
| 5,730,948 A | 3/1998 | Klatte et al. |
| 5,776,850 A | 7/1998 | Biswell et al. |
| 5,853,689 A | 12/1998 | Klatte |
| 5,855,822 A | 1/1999 | Chen |
| 5,885,543 A | 3/1999 | Klatte |
| 5,974,810 A | 11/1999 | Speronello |
| 5,989,497 A | 11/1999 | Labonte, Jr. |
| 6,077,495 A | 6/2000 | Speronello et al. |
| 6,132,748 A | 10/2000 | Khanna et al. |
| 6,174,508 B1 | 1/2001 | Klatte et al. |
| 6,238,643 B1 | 5/2001 | Thangaraj et al. |
| 6,267,953 B1 | 7/2001 | Bernier et al. |
| 6,379,643 B1 | 4/2002 | Klatte et al. |
| 6,383,541 B1 | 5/2002 | Danner et al. |
| 6,423,277 B1 | 7/2002 | Gravitt et al. |
| 6,423,289 B1 | 7/2002 | Klatte et al. |
| 6,458,735 B1 | 10/2002 | Klatte et al. |
| 6,503,419 B2 | 1/2003 | Klatte et al. |
| 6,592,919 B1 | 7/2003 | Matthews et al. |
| 6,602,466 B2 | 8/2003 | Hamilton et al. |
| 6,605,558 B2 | 8/2003 | Klatte et al. |
| 6,607,696 B1 | 8/2003 | Hamilton et al. |
| 6,635,230 B2 | 10/2003 | Klatte et al. |
| 7,220,367 B2 | 5/2007 | Speronello et al. |
| 7,273,567 B1 | 9/2007 | Wellinghoff et al. |
| 7,347,994 B2 | 3/2008 | Tenney et al. |
| 7,625,533 B2 | 12/2009 | Doona et al. |
| 7,883,640 B2 | 2/2011 | Doona et al. |
| 7,922,992 B2 | 4/2011 | Ernst et al. |
| 8,622,209 B2 | 1/2014 | Isaac et al. |
| 8,709,396 B2 | 4/2014 | Tenney et al. |
| 9,227,156 B2 | 1/2016 | Richardson et al. |
| 9,382,116 B2 | 7/2016 | Isaac et al. |
| 9,414,611 B2 | 8/2016 | Ernst et al. |
| 9,901,105 B2 | 2/2018 | Ernst et al. |
| 10,076,129 B1 | 9/2018 | Micka |
| 2001/0036421 A1 | 11/2001 | Speronello et al. |
| 2001/0038805 A1 | 11/2001 | Hamilton et al. |
| 2002/0028191 A1 | 3/2002 | Bernier et al. |
| 2002/0036284 A1 | 3/2002 | Speronello et al. |
| 2002/0056830 A1 | 5/2002 | Klatte et al. |
| 2002/0122854 A1 | 9/2002 | Danner et al. |
| 2003/0021819 A1 | 1/2003 | Khanna et al. |
| 2003/0082087 A1 | 5/2003 | Klatte et al. |
| 2003/0215381 A1 | 11/2003 | Rosenblatt et al. |
| 2004/0051080 A1 | 3/2004 | Ernst et al. |
| 2006/0099121 A1 | 5/2006 | Doona et al. |
| 2007/0039898 A1 | 2/2007 | Dee |
| 2007/0081919 A1 | 4/2007 | Koermer et al. |
| 2007/0237671 A1 | 10/2007 | Yuan et al. |
| 2008/0025870 A1 | 1/2008 | Groenewegen et al. |
| 2008/0131395 A1 | 6/2008 | Wellinghoff et al. |
| 2010/0075004 A1 | 3/2010 | Nelson et al. |
| 2010/0209332 A1 | 8/2010 | Hratko et al. |
| 2012/0024744 A1 | 2/2012 | Harrison et al. |
| 2013/0034473 A1* | 2/2013 | Taguchi ............... B01J 19/123 422/186.3 |
| 2013/0287722 A1 | 10/2013 | Uhlmann |
| 2014/0086821 A1 | 3/2014 | Ozawa et al. |
| 2014/0147360 A1 | 5/2014 | Richardson et al. |
| 2014/0193522 A1* | 7/2014 | Isaac ................... C01B 11/022 424/661 |
| 2015/0173381 A1 | 6/2015 | Micka et al. |
| 2015/0173382 A1 | 6/2015 | Ernst et al. |
| 2017/0332674 A1 | 11/2017 | Annous et al. |

FOREIGN PATENT DOCUMENTS

| | | |
|---|---|---|
| CN | 101253881 A | 9/2008 |
| CN | 101411334 A | 4/2009 |
| CN | 102249194 A | 11/2011 |
| CN | 102422841 A | 4/2012 |
| CN | 105453920 A | 4/2016 |
| EP | 0132049 A1 | 1/1985 |
| EP | 0159660 A2 | 10/1985 |
| EP | 159660 A2 | 10/1985 |
| JP | S52038028 B1 | 9/1977 |
| JP | S5667521 U | 6/1981 |
| JP | S58161904 U | 9/1983 |
| JP | S60827 Y2 | 1/1985 |
| JP | S61256915 A | 11/1986 |
| JP | S6471804 A | 3/1989 |
| JP | 02009318 | 1/1990 |
| JP | H02198629 A | 8/1990 |
| JP | H03979 U | 1/1991 |
| JP | H0323863 U | 3/1991 |
| JP | 6285368 B2 | 10/1994 |
| JP | 08309099 A | 11/1996 |
| JP | 5342054 B2 | 8/2013 |
| JP | 2014196207 A | 10/2014 |
| KR | 20040095440 A | 11/2004 |
| KR | 200380383 Y1 | 3/2005 |
| KR | 100726421 B1 | 6/2007 |
| KR | 20130018756 A | 2/2013 |
| KR | 20130079244 A | 7/2013 |
| KR | 20160011341 A | 2/2016 |
| WO | 8505008 A1 | 11/1985 |
| WO | 8505038 A1 | 11/1985 |
| WO | 9811776 A1 | 3/1998 |
| WO | 9838865 A1 | 9/1998 |
| WO | 9962817 A1 | 12/1999 |
| WO | 0010695 A1 | 3/2000 |
| WO | 0035495 A1 | 6/2000 |
| WO | 0065910 A1 | 11/2000 |
| WO | 0069775 A1 | 11/2000 |
| WO | 03051407 A1 | 6/2003 |
| WO | 2015098730 A1 | 7/2015 |

OTHER PUBLICATIONS

Calderon et al. "Chlorine Dioxide absorption by potatoes in a packed bed," Poster, Orlando, FL, Jan. 6, 2015.

Chen. "A Focus on Chlorine Dioxide: The Promising Food Preservative," Journal of Experimental Food Chemistry, 2017, 3(1), 1000e107.

(56) References Cited

OTHER PUBLICATIONS

Crawford, et al., "Decomposition Rate Studies in the Gaseous Chlorine Dioxide-Water System", APPI, 1968, 51(5), pp. 226-230.
DeVries. "Chlorine Dioxide Trial Strawberries," Well-Pict, Oxnard, VA, Nov. 11, 2010.
FoodDefend, FruitGard, Brochure, Aug. 21, 2014 (2 pages).
Gomez-Lopez, et al., "Chlorine dioxide for minimally processed produce preservation: a review", Trends in Food & Science Technology, 2009, 20, 17-26.
Grevens et al. "Evaluation of FruitGard and standard post-harvest fungicides for control of potato pink rot and silver scurf under storage conditions," Poster, University of Wisconsin, Madison, WI, Jan. 5, 2015.
Lorcheim. "Reducing Food Recalls with Microbial Fumigation of Food Processing Facilities," Food Protection Trends, Sep.-Oct. 2013, 334-336.
Mahovic, et al., "Applications of Chlorine Dioxide Gas for Control of Bacterial Soft Rot in Tomatoes", Plant Disease, 2007, 91(10), 1316-1320.
McHale, et al., "The Explosive Decomposition of CHlorine Dioxide", Journal of Physical Chemistry. 1968, 72(6), pp. 1849-1856.
Netramai, , "Utlization of Chlorine Dioxide Gas in Food Packaging Applications.", Thesis. Michigan State University. 2011.
O'Connell. "On 'Gard': New option emerges for rot control in potato storage," Spudman, Jul./Aug. 2018, pp. 16-17.
Olsen, et al., "Efficacy of chlorine dioxide for disease control on stored potatoes", American Journal of Potato Research, 2003, 80, 387-395.
Olsen, et al., "The use of chlorine dioxide in potato storage", University of Idaho, College of Agriculture, 2000, Bulletin 825.
Rao, et al., "Perchlorate Fromation by Ozone Oxidation of Aqueous Chlorine/Oxy-Chlorine Species: Role of ClxOy Radicals", Envinronmental Science and Technology. 2010, 44, pp. 2961-2967.
Scruggs et al. "Cultural, Chemical, and Alternative Control Strategies for Rhizopus Soft Rot of Sweetpotato," Plant Disease, 2016, 100(8), 1532-1540.
Simpson, et al., "A focus on Chlorine Dioxide: The 'Ideal' Biocide", 2000, Houston, Tex. Unichem Intl. Inc., 20 pages, Available from:www.clo2.com/reading/waste/corrosion.html, accessed on Sep. 19, 2008.
Smith et al. "Distribution and chemical fate of 36Cl-Chlorine dioxide gas during the fumigation of tomatoes and cantaloupe," Journal of Agricultural and Food Chemistry, 2014, 62, 11756-11766.
Smith et al. "Chloroxyanion Residues in Cantaloupe and Tomatoes after Chlorine Dioxide Gas Sanitation," Journal of Agricultural and Food Chemistry, 2015, 63, 9640-9649.
Spinks, et al., "Photodecomposition of Chlorine Dioxide", ACS, 1934, 56(2), pp. 264-270.
Sy. Evaluation of Chlorine dioxide gas as a sanitizer for fresh fruits and vegetables. Masters Thesis. University of Georgia, 2004, 127 pages.
Sy et al. Evaluation of Gaseous Chlorine Dioxide as a Sanitizer for Killing *Salmonella, Escherichia coli* O157:H7, Listeria monocytogenes, and Yeasts and Molds on Fresh and Fresh-Cut Produce, Journal of Food Protection, 2005, 68(6), 1176-1187.
Tenney. Z Series Coil Cleaner, Tri Fold Brochure, Newnan, GA, Mar. 19, 2013 (2 pages).
Tenney, ICA TriNova, FoodDefend Interventions, Presentation, Ft. Pierce, FL, Oct. 27, 2016.
Tenney, ICA TriNova, Safety Data Sheet, FruitGard Maintenance Part A, Sep. 18, 2013.
Tenney, ICA TriNova, Safety Data Sheet, FruitGard Maintenance Part B, Jun. 18, 2013.
Tenney, ICA TriNova, Safety Data Sheet, FruitGard Wipeout Part A, Sep. 18, 2013.
Tenney, ICA TriNova, Safety Data Sheet, FruitGard Wipeout Part B, Jun. 18, 2013.
Tenney. Z Series brochure, Marietta, GA, Sep. 29, 2008 (1 page).
Trinetta, et al., "Evaluation of Chlorine Dioxide Gas Residues on Selected Food Produce", Journal of Food Science, 2011, 76(1), T11-T15.
Tsai, et al., "Prevention of Potato Spoilage During Storage by Chlorine Dioxide", Journal of Food Science, 2001, 66(3), 472-477.
Vandekinderen, et al., "Effects of tantalum oxide films on stability and optical memory in electrochromic tungsten oxide films", International Journal of Food Microbiology, 2009, 131, 138-144.
Wu et al. "A simple gaseous chlorine dioxide method for microbial decontamination on potatoes during storage," Poster, University of Maine, Aug. 4, 2008.
Wu et al. "A simple instrument-free gaseous chlorine dioxide method for microbial decontamination of potatoes during storage." Food Microbiology, 2010, 27, 179-184.
Xin, et al., "Highly Selective Spectrophotometric Determination of Chlorine Dioxide in Water using Rhodamine B", Analyst. 1995, 120, pp. 1199-1200.

* cited by examiner

METHODS OF PRODUCING A GAS AT A VARIABLE RATE

CROSS-REFERENCE TO RELATED APPLICATIONS

This application claims the benefit of priority to U.S. Provisional Application 62/489,716, filed Apr. 25, 2017, which is hereby incorporated herein by reference in its entirety.

BACKGROUND

Various methods of producing chlorine dioxide and carbon dioxide are known in the art. However, the rates at which these methods produce the gasses are usually uncontrollable once the reaction is initiated. In many cases, the gas is produced very rapidly over a short period of time. Meanwhile, many uses of these gases would benefit from having control over the rate of the release of the gas. Accordingly, methods to produce gasses such as chlorine dioxide and/or carbon dioxide at a variable rate are still needed. The methods discussed herein address these and other needs.

SUMMARY

In accordance with the purposes of the disclosed compositions and methods, as embodied and broadly described herein, the disclosed subject matter relates to methods of producing a gas at a variable rate.

Disclosed herein are methods of producing a gas at a variable rate, the methods comprising dynamically mixing dry particles comprising a precursor and dry particles comprising a proton-generating species to produce a gas.

In some examples, the dry particles comprising the precursor can include a porous carrier wherein the precursor is impregnated in the porous carrier. In some examples, the porous carrier is inert. In some examples, the porous carrier has pores, channels, or the like located therein. Exemplary porous carriers include, but are not limited to, silica, pumice, diatomaceous earth, bentonite, clay, porous polymer, alumina, zeolite (e.g., zeolite crystals), or mixtures thereof. In some examples, the dry particles comprising the precursor include from 1% to 50% by weight of the precursor.

In some embodiments, the dry precursor particles can, for example, comprise a chlorine dioxide precursor and the gas can comprise chlorine dioxide; the dry precursor particles can comprise a carbon dioxide precursor and the gas can comprise carbon dioxide; or a combination thereof.

The chlorine dioxide precursor can, for example, comprise a chlorine dioxide-producing compound selected from the group consisting of a metal chlorite, a metal chlorate, chloric acid, hypochlorous acid, and combinations thereof. Examples of metal chlorites include, but are not limited to, sodium chlorite, barium chlorite, calcium chlorite, lithium chlorite, potassium chlorite, magnesium chlorite, and combinations thereof. Examples of metal chlorates include, but are not limited to, sodium chlorate, lithium chlorate, potassium chlorate, magnesium chlorate, barium chlorate, and combinations thereof.

The carbon dioxide precursor can, for example, comprise a carbon-containing compound selected from the group consisting of carbonates, bicarbonates, sesquicarbonates, and combinations thereof. Examples of carbon-containing compounds include, but are not limited to, sodium carbonate, sodium bicarbonate, sodium sesquicarbonate, and combinations thereof.

The proton-generating species can, for example, comprise an organic acid, an inorganic acid, a metal salt, or a combination thereof. In some examples, the organic acid and/or an inorganic acid can be selected from the group consisting of acetic acid, citric acid, hydrochloric acid, phosphoric acid, propionic acid, sulfuric acid, and combinations thereof. Examples of metal salts include, but are not limited to, ferric chloride, ferric sulfate, $CaCl_2$, $ZnSO_4$, $ZnCl_2$, $CoSO_4$, $CoCl_2$, $MnSO_4$, $MnCl_2$, $CuSO_4$, $CuCl_2$, $MgSO_4$, sodium acetate, sodium citrate, sodium sulfate, sodium bisulfate, hydrogen phosphate, disodium hydrogen phosphate, and combinations thereof.

In some examples, the dry particles comprising the proton-generating species can further comprise a porous carrier and the proton-generating species can be impregnated in the porous carrier. Exemplary porous carriers include, but are not limited to, silica, pumice, diatomaceous earth, bentonite, clay, porous polymer, alumina, zeolite (e.g., zeolite crystals), or mixtures thereof. In some examples, the dry particles comprising the proton-generating species include from 1% to 50% by weight of the proton-generating species (e.g., from 1% to 20%, or from 5% to 15%).

In the methods described herein, the rate that the gas is produced is varied. For example, the gas is produced at a rate that is varied by varying the amount of time the dry particles comprising the precursor and the dry particles comprising the proton-generating species are dynamically mixed, the rate at which the dry particles comprising the precursor and the dry particles comprising the proton-generating species are dynamically mixed, or a combination thereof. In some examples, the dry particles comprising the precursor and dry particles comprising the proton-generating species are dynamically mixed in a mixer selected from the group consisting of a tumbler, a vibratory mixer, a rotary mixer, a marinator mixer, and a stirrer. In some examples, the dry particles comprising the precursor and dry particles comprising the proton-generating species are dynamically mixed in a mixer selected from the group consisting of a tumbler, a rotary mixer, a marinator mixer, and a stirrer at a rate of from 1 revolution per day (RPD) to 100 revolutions per minute (RPM). In some examples, the dry particles comprising the precursor and dry particles comprising the proton-generating species are dynamically mixed in a vibratory mixer at a rate of from 1 Hertz (Hz) to 20 kiloHertz (kHz). In some examples, the amount of time that the dry particles comprising the precursor and dry particles comprising the proton-generating species are dynamically mixed is from 1 minute to 24 hours.

In some examples, dynamically mixing the dry particles comprising the precursor and the dry particles comprising the proton-generating species comprises: providing a first portion of the dry particles comprising the precursor and the dry particles comprising the proton-generating species; dynamically mixing the first portion of the dry particles comprising the precursor and the dry particles comprising the proton-generating species to form a mixture; providing a second portion of the dry particles comprising the precursor; and dynamically mixing the second portion of the dry particles comprising the precursor and the mixture.

In some examples, dynamically mixing the dry particles comprising the precursor and the dry particles comprising the proton-generating species comprises: providing the dry particles comprising the precursor and a first portion of the dry particles comprising the proton-generating species;

dynamically mixing the dry particles comprising the precursor and the first portion of the dry particles comprising the proton-generating species to form a mixture; providing a second portion of the dry particles comprising the proton-generating species; and dynamically mixing the second portion of the dry particles comprising the proton-generating species and the mixture.

In some examples, the dry particles comprising the precursor are provided continuously over the amount of time that the dry particles comprising the precursor and dry particles comprising the proton-generating species are dynamically mixed.

In some examples, the dry particles comprising the proton-generating species are provided continuously over the amount of time that the dry particles comprising the precursor and dry particles comprising the proton-generating species are dynamically mixed.

In some examples, the dry particles comprising the precursor and dry particles comprising the proton-generating species are dynamically mixed for a first amount of time, after which the dry particles comprising the precursor and dry particles comprising the proton-generating species are static for a second amount of time. The second amount of time can be, for example, from 1 minute to 24 hours.

In some examples, after the second amount of time, the dry particles comprising the precursor and dry particles comprising the proton-generating species are dynamically mixed for a third amount of time. In some examples, after the second amount of time a second amount of dry particles comprising the precursor are provided and the second amount of dry particles comprising the precursor are dynamically mixed with the first amount of the dry particles comprising the precursor and dry particles comprising the proton-generating species for a third amount of time. The third amount of time can be, for example, from 1 minute to 24 hours.

In some examples, the methods can further comprise milling, crushing, abrading, or a combination thereof the dry particles comprising the precursor and dry particles comprising the proton-generating species. In some examples, the methods can further comprise dynamically mixing an abrasive particle with the dry particles comprising the precursor and dry particles comprising the proton-generating species.

In some examples, the methods can further comprise dynamically mixing a deliquescent with the dry particles comprising the precursor and dry particles comprising the proton-generating species. In some examples, the methods can further comprise dynamically mixing a desiccant with the dry particles comprising the precursor and dry particles comprising the proton-generating species.

The gas can, for example, be produced at a rate of from 1 milliliter per minute (mL/min) to 5000 mL/min. In some examples, the gas is chlorine dioxide and 80% or more of the precursor is converted to the gas (e.g., 90% or more, 95% or more, or 99% or more). In some examples, the gas is carbon dioxide and from 1% to 75% of the precursor is converted to the gas.

Additional advantages of the disclosed compositions and methods will be set forth in part in the description which follows, and in part will be obvious from the description. The advantages of the disclosed compositions will be realized and attained by means of the elements and combinations particularly pointed out in the appended claims. It is to be understood that both the foregoing general description and the following detailed description are exemplary and explanatory only and are not restrictive of the disclosed compositions and methods, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

DETAILED DESCRIPTION

Figure 1:
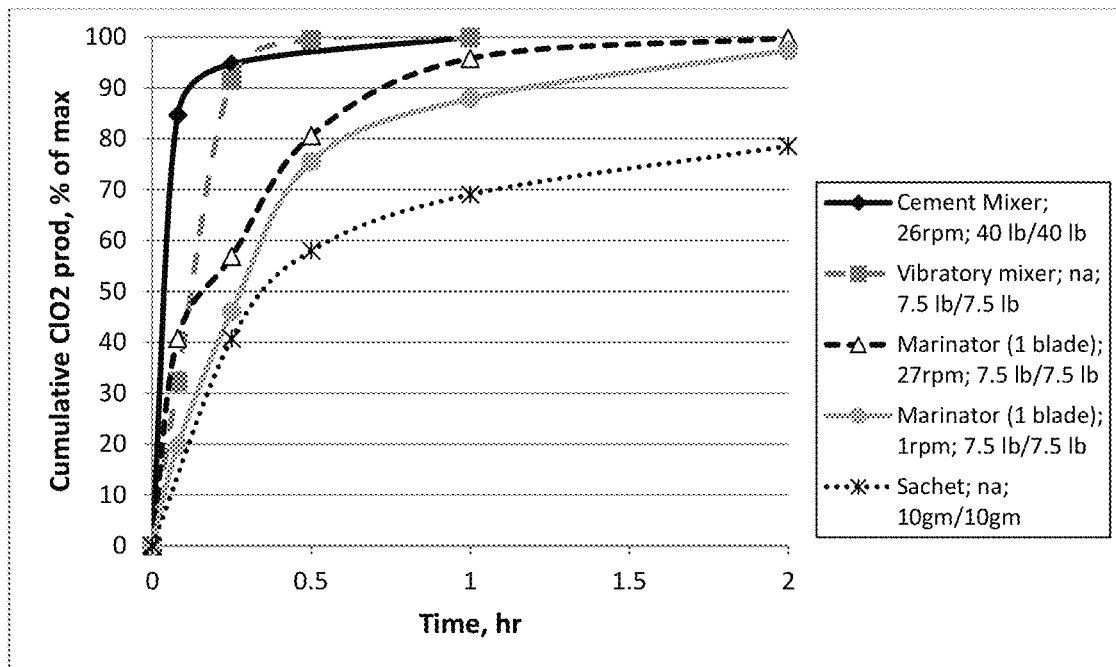
FIG. 1 is a graph of cumulative chlorine dioxide produced over time using various dynamic mixing strategies.

The compositions and methods described herein may be understood more readily by reference to the following detailed description of specific aspects of the disclosed subject matter and the examples included therein.

Before the present compositions and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings:

Throughout the description and claims of this specification the word "comprise" and other forms of the word, such as "comprising" and "comprises," means "including but not limited to," and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, reference to "an agent" includes mixture of two or more such agents, and the like.

It is understood that throughout this specification the identifiers "first" and "second" are used solely to aid the reader in distinguishing the various components, features, or steps of the disclosed subject matter. The identifiers "first" and "second" are not intended to imply any particular order, amount, preference, or importance to the components or steps modified by these terms.

Disclosed herein are methods of producing a gas at a variable rate, the methods comprising dynamically mixing dry particles comprising a precursor and dry particles comprising a proton-generating species to produce a gas. As used herein, the term "dry particles" indicates the particles have a water content of 20% or less (e.g., 15% or less, 10% or less, 5% or less, 4% or less, 3% or less, 2% or less, or 1% or less) by weight.

The dry particles comprising the precursor can be provided in any form that allows the precursor to react with the proton-generating species to produce the gas. In some examples, the dry particles comprising the precursor are in the form of a powder. In some examples, the dry particles comprising the precursor can include a porous carrier wherein the precursor is impregnated in the porous carrier. In some examples, the porous carrier is inert. In some examples, the porous carrier has pores, channels, or the like located therein. Exemplary porous carriers include, but are not limited to, silica, pumice, diatomaceous earth, bentonite, clay, porous polymer, alumina, zeolite (e.g., zeolite crystals), or mixtures thereof.

The porous carrier can have an average particle size. "Average particle size" and "mean particle size" are used interchangeably herein, and generally refer to the statistical mean particle size of the particles in a population of particles. For example, the average particle size for a plurality of particles with a substantially spherical shape can comprise the average diameter of the plurality of particles. For an anisotropic particle, the average particle size can refer to, for example, the average maximum dimension of the particle (e.g., the length of a rod shaped particle, the diagonal of a cube shape particle, the bisector of a triangular shaped particle, etc.) Mean particle size can be measured using methods known in the art, such as sieving or microscopy.

In some examples, the porous carrier can have an average particle size, in their largest dimension, of 0.5 micrometers (microns, $\mu m$) or more (e.g., 1 $\mu m$ or more, 2 $\mu m$ or more, 3 $\mu m$ or more, 4 $\mu m$ or more, 5 $\mu m$ or more, 10 $\mu m$ or more, 15 $\mu m$ or more, 20 $\mu m$ or more, 25 $\mu m$ or more, 30 $\mu m$ or more, 35 $\mu m$ or more, 40 $\mu m$ or more, 50 $\mu m$ or more, 60 $\mu m$ or more, 70 $\mu m$ or more, 80 $\mu m$ or more, 90 $\mu m$ or more, 100 $\mu m$ or more, 125 $\mu m$ or more, 150 $\mu m$ or more, 175 $\mu m$ or more, 200 $\mu m$ or more, 225 $\mu m$ or more, 250 $\mu m$ or more, 300 $\mu m$ or more, 350 $\mu m$ or more, 400 $\mu m$ or more, 450 $\mu m$ or more, 500 $\mu m$ or more, 600 $\mu m$ or more, 700 $\mu m$ or more, 800 $\mu m$ or more, 900 $\mu m$ or more, 1 millimeters (mm) or more, 2 mm or more, 3 mm or more, 4 mm or more, 5 mm or more, 6 mm or more, 7 mm or more, 8 mm or more, 9 mm or more, 10 mm or more, 15 mm or more, or 20 mm or more). In some examples, the porous carrier can have an average particle size of 25.4 mm (e.g., 1 inch) or less (e.g., 24 mm or less, 23 mm or less, 22 mm or less, 21 mm or less, 20 mm or less, 19 mm or less, 18 mm or less, 17 mm or less, 16 mm or less, 15 mm or less, 14 mm or less, 13 mm or less, 12 mm or less, 11 mm or less, 10 mm or less, 9 mm or less, 8 mm or less, 7 mm or less, 6 mm or less, 5 mm or less, 4 mm or less, 3 mm or less, 2 mm or less, 1 mm or less, 900 $\mu m$ or less, 800 $\mu m$ or less, 700 $\mu m$ or less, 600 $\mu m$ or less, 500 $\mu m$ or less, 450 $\mu m$ or less, 400 $\mu m$ or less, 350 $\mu m$ or less, 300 $\mu m$ or less, 250 $\mu m$ or less, 225 $\mu m$ or less, 200 $\mu m$ or less, 175 $\mu m$ or less, 150 $\mu m$ or less, 125 $\mu m$ or less, 100 $\mu m$ or less, 90 $\mu m$ or less, 80 $\mu m$ or less, 70 $\mu m$ or less, 60 $\mu m$ or less, 50 $\mu m$ or less, 40 $\mu m$ or less, 35 $\mu m$ or less, 30 $\mu m$ or less, 25 $\mu m$ or less, 20 $\mu m$ or less, 15 $\mu m$ or less, 10 $\mu m$ or less, or 5 $\mu m$ or less). The average particle size of the porous carrier in their largest dimension can range from any of the minimum values described above to any of the maximum values described above. For example, the porous carrier can have an average particle size of from 0.5 $\mu m$ to 25.4 mm (e.g., 0.5 $\mu m$ to 1 mm, from 1 mm to 25.4 mm, from 0.5 $\mu m$ to 100 $\mu m$, from 100 $\mu m$ to 500 $\mu m$, from 500 $\mu m$ to 1 mm, from 1 mm to 10 mm, from 10 mm to 25.4 mm, from 175 $\mu m$ to 400 $\mu m$, or from 600 $\mu m$ to 2 mm). The average particle size of the porous carrier can be selected in view of a variety of factors. In some examples, the average particle size of the porous carrier can be selected based on the desired rate of gas production. In some embodiments, the porous carrier is uniformly impregnated throughout the volume of the porous carrier via the pores, channels, and the like, with the precursor.

In some examples, the dry particles comprising the precursor include 1% or more by weight of the precursor (e.g., 5% or more, 10% or more, 15% or more, 20% or more, 25% or more, 30% or more, 35% or more, 40% or more, 45% or more, 50% or more, 60% or more, 70% or more, 80% or more, or 90% or more). In some examples. The dry particle comprising the precursor includes 100% or less by weight of the precursor (e.g., 95% or less, 90% or less, 85% or less, 80% or less, 75% or less, 70% or less, 65% or less, 60% or less, 55% or less, 50% or less, 40% or less, 30% or less, 20% or less, or 10% or less). In some embodiments, the dry particles comprising the precursor includes a porous carrier impregnated with a precursor and the porous carrier includes 1% or more by weight of the precursor (such as in the amounts provided above) and/or 50% or less by weight of the precursor (e.g., 40% or less, 30% or less, 20% or less, or 10% or less). The amount of precursor in the dry particles comprising the precursor can range from any of the minimum values described above to any of the maximum values described above. For example, the dry particle comprising the precursor can include from 1% to 100% by weight of the precursor (e.g., from 1% to 50%, from 50% to 100%, from 1% to 25%, from 25% to 50%, from 50% to 75%, from 75% to 100%, from 10% to 90%, from 5% to 50%, from 5% to 45%, or from 10% to 40%).

In some examples, the porous carrier is impregnated with the precursor by using a porous carrier that has a low moisture (e.g., water) content. In some examples, the low moisture content is 5% or less (e.g., 4% or less, 3% or less, 2% or less, or 1% or less) by weight. In some examples, the porous carrier has an initial moisture content above 5% and thus can be dehydrated to produce a moisture content of 5% or less. In some examples, the dehydrated porous carrier is then immersed in or sprayed with an aqueous solution of the precursor at an elevated temperature (e.g., in the range from 120° F. to 190° F.) and the resulting slurry is thoroughly mixed. In some examples, the mixed slurry is then air-dried to a moisture level of 20% or less (e.g., from 0% to 20%, from 0% to 15%, from 0.25% to 10%, from 0.5% to 5%, from 0.5% to 3%) by weight to produce the impregnate (i.e., precursor impregnated in a porous carrier) disclosed herein. In some examples, the impregnate disclosed herein can be prepared without a drying step by calculating the amount of the aqueous solution of the precursor needed to achieve the desired final moisture level (e.g., from 0% to 20%, from 0% to 15%, from 0.25% to 10%, from 0.5% to 5%, from 0.5% to 3%) and adding this amount of the aqueous solution to the dehydrated porous carrier to impregnate the porous carrier, thereby forming the dry particles comprising the precursor.

In some examples, the precursor is impregnated into a porous carrier and treated with a base. In some examples, the base is any suitable base that can reduce the available protons and inhibit the reaction until the proton-generating species overcomes the base and reacts with the precursor, to enhance shelf stability and slow the reaction rate once the mixture is activated. Exemplary bases include, but are not limited to, potassium hydroxide, sodium hydroxide, calcium hydroxide, or a blend thereof.

In some embodiments, the dry precursor particles can, for example, comprise a chlorine dioxide precursor and the gas can comprise chlorine dioxide; the dry precursor particles can comprise a carbon dioxide precursor and the gas can comprise carbon dioxide; or a combination thereof.

The chlorine dioxide precursor can be selected from any composition capable of producing chlorine dioxide gas when mixed with the dry particles comprising the proton-generating species. The chlorine dioxide precursor can, for example, comprise a chlorine dioxide-producing compound selected from the group consisting of a metal chlorite, a metal chlorate, chloric acid, hypochlorous acid, and combinations thereof. Examples of metal chlorites include, but are not limited to, sodium chlorite, barium chlorite, calcium chlorite, lithium chlorite, potassium chlorite, magnesium chlorite, and combinations thereof. Examples of metal chlorates include, but are not limited to, sodium chlorate, lithium chlorate, potassium chlorate, magnesium chlorate, barium chlorate, and combinations thereof. In some examples, the chlorine dioxide precursor is impregnated in a porous carrier such as zeolite crystals as described above and as described in U.S. Pat. Nos. 5,567,405; 5,573,743; 5,730,948; 5,776,850; 5,853,689; 5,885,543; 6,174,508; 6,379,643; 6,423,289; 7,347,994; 7,922,992; and 9,382,116, which are incorporated by reference in their entirety.

The carbon dioxide precursor can be selected from any composition capable of producing carbon dioxide gas when mixed with the dry particles comprising the proton-generating species. The carbon dioxide precursor can, for example, comprise a carbon-containing compound selected from the group consisting of carbonates, bicarbonates, sesquicarbonates, and combinations thereof. Examples of carbon-containing compounds include, but are not limited to, sodium carbonate, sodium bicarbonate, sodium sesquicarbonate, and combinations thereof. In some examples, the carbon dioxide precursor is impregnated in a porous carrier such as zeolite crystals as described above and as described in U.S. Pat. Nos. 7,992,992 and 8,709,396, which are hereby incorporated herein by reference in their entirety.

A proton-generating species as disclosed herein can be any composition capable of generating protons to react with the precursor to generate the gas. The proton-generating species can, for example, comprise an organic acid, an inorganic acid, a metal salt, or a combination thereof. In some examples, the organic acid and/or an inorganic acid can be selected from the group consisting of acetic acid, citric acid, hydrochloric acid, phosphoric acid, propionic acid, sulfuric acid, and combinations thereof. Examples of metal salts include, but are not limited to, ferric chloride, ferric sulfate, $CaCl_2$, $ZnSO_4$, $ZnCl_2$, $CoSO_4$, $CoCl_2$, $MnSO_4$, $MnCl_2$, $CuSO_4$, $CuCl_2$, $MgSO_4$, sodium acetate, sodium citrate, sodium sulfate, sodium bisulfate, hydrogen phosphate, disodium hydrogen phosphate, and combinations thereof.

The dry particles comprising the proton-generating species can be provided in any form that allows the release of protons. In some examples, the proton-generating species is in the form of a powder. In some examples, the dry particles comprising the proton-generating species can further comprise a porous carrier and the proton-generating species can be impregnated in the porous carrier. In some examples, the porous carrier is inert. In some examples, the porous carrier has pores, channels, or the like located therein. Exemplary porous carriers include, but are not limited to, silica, pumice, diatomaceous earth, bentonite, clay, porous polymer, alumina, zeolite (e.g., zeolite crystals), or mixtures thereof. In some examples, the porous carrier can have an average particle size, in their largest dimension, of 0.5 micrometers (microns, μm) or more (e.g., 1 μm or more, 2 μm or more, 3 μm or more, 4 μm or more, 5 μm or more, 10 μm or more, 15 μm or more, 20 μm or more, 25 μm or more, 30 μm or more, 35 μm or more, 40 μm or more, 50 μm or more, 60 μm or more, 70 μm or more, 80 μm or more, 90 μm or more, 100 μm or more, 125 μm or more, 150 μm or more, 175 μm or more, 200 μm or more, 225 μm or more, 250 μm or more, 300 μm or more, 350 μm or more, 400 μm or more, 450 μm or more, 500 μm or more, 600 μm or more, 700 μm or more, 800 μm or more, 900 μm or more, 1 millimeters (mm) or more, 2 mm or more, 3 mm or more, 4 mm or more, 5 mm or more, 6 mm or more, 7 mm or more, 8 mm or more, 9 mm or more, 10 mm or more, 15 mm or more, or 20 mm or more). In some examples, the porous carrier can have an average particle size of 25.4 mm (e.g., 1 inch) or less (e.g., 24 mm or less, 23 mm or less, 22 mm or less, 21 mm or less, 20 mm or less, 19 mm or less, 18 mm or less, 17 mm or less, 16 mm or less, 15 mm or less, 14 mm or less, 13 mm or less, 12 min or less, 11 mm or less, 10 mm or less, 9 mm or less, 8 mm or less, 7 mm or less, 6 mm or less, 5 mm or less, 4 mm or less, 3 mm or less, 2 mm or less, 1 mm or less, 900 μm or less, 800 μm or less, 700 μm or less, 600 μm or less, 500 μm or less, 450 μm or less, 400 μm or less, 350 μm or less, 300 μm or less, 250 μm or less, 225 μm or less, 200 μm or less, 175 μm or less, 150 μm or less, 125 μm or less, 100 μm or less, 90 μm or less, 80 μm or less, 70 μm or less, 60 μm or less, 50 μm or less, 40 μm or less, 35 μm or less, 30 μm or less, 25 μm or less, 20 μm or less, 15 μm or less, 10 μm or less, or 5 μm or less), in their largest dimension. The average particle size of the porous carrier in their largest dimension can range from any of the minimum values described above to any of the maximum values described above. For example, the porous carrier can have an average particle size of from 0.5 μm to 25.4 mm (e.g., 0.5 μm to 1 mm, from 1 mm to 25.4 mm, from 0.5 μm to 100 μm, from 100 μm to 500 μm, from 500 μm to 1 mm, from 1 mm to 10 mm, from 10 mm to 25.4 mm, from 175 μm to 400 μm, or from 600 μm to 2 mm). The average particle size of the porous carrier can be selected in view of a variety of factors. In some examples, the average particle size of the porous carrier can be selected based on the desired rate of gas production. In some examples, the porous carrier is uniformly impregnated throughout the volume of the porous carrier via the pores, channels, and the like, with the proton-generating species.

In some examples, the dry particles comprising the proton-generating species include 1% or more by weight of the proton-generating species (e.g., 5% or more, 10% or more, 15% or more, 20% or more, 25% or more, 30% or more, 35% or more, 40% or more, 45% or more, 50% or more, 60% or more, 70% or more, 80% or more, or 90% or more). In some examples, the dry particles comprising the proton-generating species include 100% or less by weight of the proton-generating species (e.g., 95% or less, 90% or less, 85% or less, 80% or less, 75% or less, 70% or less, 65% or less, 60% or less, 55% or less, 50% or less, 40% or less, 30% or less, 20% or less, or 10% or less). In some embodiments, the dry particles comprising the proton-generating species includes a porous carrier impregnated with a proton-generating species and the porous carrier includes 1% or more by weight of the proton-generating species (such as in the amounts provided above) and/or 50% or less by weight of the proton-generating species (e.g., 40% or less, 30% or less, 20% or less, or 10% or less). The amount of proton-generating species in the dry particles comprising the proton-generating species can range from any of the minimum values described above to any of the maximum values described above. For example, the dry particle comprising the proton-generating species can include from 1% to 100% by weight of the proton-generating species (e.g., from 1% to 50%, from 50% to 100%, from 1% to 75%, from 1% to 40%, from 1% to 30%, from 1% to 20%, or from 5% to 15%).

In some examples, the porous carrier is impregnated with the proton-generating species by using a porous carrier that has a low moisture (e.g., water) content. In some embodiments, the low moisture content is 5% or less (e.g., 4% or less, 3% or less, 2% or less, or 1% or less) by weight. In some embodiments, the porous carrier has an initial moisture content above 5% and thus can be dehydrated to produce a moisture content of 5% or less. In some embodiments, the dehydrated porous carrier is then immersed in or sprayed with an aqueous solution of the proton-generating species at an elevated temperature (e.g., in the range from 120° F. to 190° F.) and the resulting slurry is thoroughly mixed. In some embodiments, the mixed slurry is then air-dried to a moisture level of from 0% to 20% (e.g., from 0% to 15%, from 0.25% to 10%, from 0.5% to 5%, from 0.5% to 3%) by weight to produce an impregnate (i.e., proton-generating species impregnated in a porous carrier). In some embodiments, the impregnate disclosed herein can be prepared without a drying step by calculating the amount of the aqueous solution of the proton-generating species needed to achieve the desired final moisture level (e.g., from 0% to 15%, from 0.25% to 10%, from 0.5% to 5%, from 0.5% to 3%) and adding this amount of the aqueous solution to the dehydrated porous carrier to impregnate the porous carrier. In some embodiments, the proton-generating species is provided in excess of the stoichiometric amount required to produce the gas when reacting with the precursor.

In the methods described herein, the rate that the gas is produced is varied. For example, the gas is produced at a rate that is varied by varying the amount of time the dry particles comprising the precursor and the dry particles comprising the proton-generating species are dynamically mixed, the rate at which the dry particles comprising the precursor and the dry particles comprising the proton-generating species are dynamically mixed, or a combination thereof. In some examples, the dry particles comprising the precursor and dry particles comprising the proton-generating species are dynamically mixed in a mixer selected from the group consisting of a tumbler, a vibratory mixer, a rotary mixer, a marinator mixer, and a stirrer. In some examples, dynamically mixing the dry particles comprising the precursor and dry particles comprising the proton-generating species can comprise dynamically agitating the dry particles comprising the precursor and dry particles comprising the proton-generating species.

In some examples, the dry particles comprising the precursor and dry particles comprising the proton-generating species are dynamically mixed in a mixer selected from the group consisting of a tumbler, a rotary mixer, a marinator mixer, and a stirrer at a rate of 1 revolution per day (RPD) or more (e.g., 2 RPD or more, 3 RPD or more, 4 RPD or more, 6 RPD or more, 8 RPD or more, 12 RPD or more, 1 revolution per hour (RPH) or more, 2 RPH or more, 3 RPH or more, 4 RPH or more, 6 RPH or more, 12 RPH or more, 1 revolution per minute (RPM) or more, 5 RPM or more, 10 RPM or more, 15 RPM or more, 20 RPM or more, 25 RPM or more, 30 RPM or more, 35 RPM or more, 40 RPM or more, 45 RPM or more, 50 RPM or more, 60 RPM or more, 70 RPM or more, 80 RPM or more, or 90 RPM or more). In some examples, the dry particles comprising the precursor and dry particles comprising the proton-generating species are dynamically mixed in a mixer selected from the group consisting of a tumbler, a rotary mixer, a marinator mixer, and a stirrer at a rate of 100 RPM or less (e.g., 90 RPM or less, 80 RPM or less, 70 RPM or less, 60 RPM or less, 50 RPM or less, 45 RPM or less, 40 RPM or less, 35 RPM or less, 30 RPM or less, 25 RPM or less, 20 RPM or less, 15 RPM or less, 10 RPM or less, 5 RPM or less, 1 RPM or less, 12 RPH or less, 6 RPH or less, 4 RPH or less, 3 RPH or less, 2 RPH or less, 1 RPH or less, 12 RPD or less, 8 RPD or less, 6 RPD or less, 4 RPD or less, 3 RPD or less, or 2 RPD or less). The rate at which the dry particles comprising the precursor and dry particles comprising the proton-generating species are dynamically mixed in a mixer selected from the group consisting of a tumbler, a rotary mixer, a marinator mixer, and a stirrer can range from any of the minimum values described above to any of the maximum values described above. For example, the dry particles comprising the precursor and dry particles comprising the proton-generating species are dynamically mixed in a mixer selected from the group consisting of a tumbler, a rotary mixer, a marinator mixer, and a stirrer at a rate of from 1 RPD to 100 RPM (e.g., from 1 RPD to 1 RPH, from 1 RPH to 1 RPM, from 1 RPM to 100 RPM, or from 4 RPD to 90 RPM).

In some examples, the dry particles comprising the precursor and dry particles comprising the proton-generating species are dynamically mixed in a vibratory mixer at a rate of 1 Hertz (Hz) or more (e.g., 25 Hz or more, 50 Hz or more, 75 Hz or more, 100 Hz or more, 150 Hz or more, 200 Hz or more, 250 Hz or more, 300 Hz or more, 350 Hz or more, 400 Hz or more 450 Hz or more, 500 Hz or more, 600 Hz or more, 700 Hz or more, 800 Hz or more, 900 Hz or more, 1 kilohertz (kHz) or more, 2 kHz or more, 3 kHz or more 4 kHz or more, 5 kHz or more, 10 kHz or more, or 15 kHz or more). In some examples, the dry particles comprising the precursor and dry particles comprising the proton-generating species are dynamically mixed in a vibratory mixer at a rate of 20 kHz or less (e.g., 15 kHz or less, 10 kHz or less, 5 kHz or less, 4 kHz or less, 3 kHz or less, 2 kHz or less, 1 kHz or less, 900 Hz or less, 800 Hz or less, 700 Hz or less, 600 Hz or less, 500 Hz or less, 450 Hz or less, 400 Hz or less, 350 Hz or less, 300 Hz or less, 250 Hz or less, 200 Hz or less, 150 Hz or less, 100 Hz or less, 75 Hz or less, 50 Hz or less, or 25 Hz or less). The rate at which the dry particles comprising the precursor and dry particles comprising the proton-generating species are dynamically mixed in a vibratory mixer can range from any of the minimum values described above to any of the maximum values described above. For example, the dry particles comprising the precursor and dry particles comprising the proton-generating species are dynamically mixed in a vibratory mixer at a rate of from 1 Hz to 20 kHz (e.g., from 1 Hz to 100 Hz, from 100 Hz to 1 kHz, from 1 kHz to 20 kHz, or from 10 Hz to 15 kHz).

In some examples, the amount of time that the dry particles comprising the precursor and dry particles comprising the proton-generating species are dynamically mixed is 1 minute or more (e.g., 5 minutes or more, 10 minutes or more, 15 minutes or more, 30 minutes or more 45 minutes or more, 1 hour or more, 2 hours or more, 3 hours or more 4 hours or more, 6 hours or more, 8 hours or more, 10 hours or more, 12 hours or more, 16 hours or more, or 20 hours or more). In some examples, the amount of time that the dry particles comprising the precursor and dry particles comprising the proton-generating species are dynamically mixed is 24 hours or less (e.g., 20 hours or less, 16 hours or less, 12 hours or less, 10 hours or less, 8 hours or less, 6 hours or less, 4 hours or less, 3 hours or less, 2 hours or less, 1 hour or less, 45 minutes or less, 30 minutes or less, 15 minutes or less, 10 minutes or less, or 5 minutes or less). The amount of time that the dry particles comprising the precursor and dry particles comprising the proton-generating species are dynamically mixed can range from any of the minimum values described above to any of the maximum values described above. For example, the amount of time that the dry particles comprising the precursor and dry particles comprising the proton-generating species are dynamically mixed can be from 1 minute to 24 hours (e.g., from 1 minute to 1 hour, from 1 hour to 12 hours, from 12 hours to 24 hours, or from 10 minutes to 20 hours).

In some examples, dynamically mixing the dry particles comprising the precursor and the dry particles comprising the proton-generating species comprises: providing a first portion of the dry particles comprising the precursor and the dry particles comprising the proton-generating species; dynamically mixing the first portion of the dry particles comprising the precursor and the dry particles comprising the proton-generating species to form a mixture; providing a second portion of the dry particles comprising the precursor; and dynamically mixing the second portion of the dry particles comprising the precursor and the mixture. In some examples, the methods can likewise further comprise providing a third portion of the dry particles comprising the precursor. In some examples, the methods can likewise further comprise providing a fourth portion of the dry particles comprising the precursor, or as many additional portions of dry particles comprising the precursor as are desired.

In some examples, dynamically mixing the dry particles comprising the precursor and the dry particles comprising the proton-generating species comprises: providing the dry particles comprising the precursor and a first portion of the dry particles comprising the proton-generating species; dynamically mixing the dry particles comprising the precursor and the first portion of the dry particles comprising the proton-generating species to form a mixture; providing a second portion of the dry particles comprising the proton-generating species; and dynamically mixing the second portion of the dry particles comprising the proton-generating species and the mixture. In some examples, the methods can likewise further comprise providing a third portion of the dry particles comprising the proton-generating species. In some examples, the methods can likewise further comprise providing a fourth portion of the dry particles comprising the proton-generating species, or as many additional portions of dry particles comprising the proton-generating species as are desired.

In some examples, the dry particles comprising the precursor are provided continuously over the amount of time that the dry particles comprising the precursor and dry particles comprising the proton-generating species are dynamically mixed such as by adding dry particles comprising the precursor to the mixer during mixing.

In some examples, the dry particles comprising the proton generating species are provided continuously over the amount of time that the dry particles comprising the precursor and dry particles comprising the proton-generating species are dynamically mixed such as by adding dry particles comprising the proton-generating species to the mixer during mixing.

In some examples, the dry particles comprising the precursor and dry particles comprising the proton-generating species are dynamically mixed for a first amount of time, after which the dry particles comprising the precursor and dry particles comprising the proton-generating species are static for a second amount of time. The second amount of time can be, for example, 1 minute or more (e.g., 5 minutes or more, 10 minutes or more, 15 minutes or more, 30 minutes or more 45 minutes or more, 1 hour or more, 2 hours or more, 3 hours or more 4 hours or more, 6 hours or more, 8 hours or more, 10 hours or more, 12 hours or more, 16 hours or more, or 20 hours or more). In some examples, the second amount of time can be 24 hours or less (e.g., 20 hours or less, 16 hours or less, 12 hours or less, 10 hours or less, 8 hours or less, 6 hours or less, 4 hours or less, 3 hours or less, 2 hours or less, 1 hour or less, 45 minutes or less, 30 minutes or less, 15 minutes or less, 10 minutes or less, or 5 minutes or less). The second amount of time can range from any of the minimum values described above to any of the maximum values described above. For example, the second amount of time can be from 1 minute to 24 hours (e.g., from 1 minute to 1 hour, from 1 hour to 12 hours, from 12 hours to 24 hours, or from 10 minutes to 20 hours).

In some examples, after the second amount of time, the dry particles comprising the precursor and dry particles comprising the proton-generating species are dynamically mixed for a third amount of time. In some examples, likewise, after the third amount of time, the dry particles comprising the precursor and the dry particles comprising the proton-generating species are static for a fourth amount of time, and after the fourth amount of time, the dry particles comprising the precursor and the dry particles comprising the proton-generating species are dynamically mixed for a fifth amount of time. The dynamic mixing can be thus pulsed for any desired number of times, with the amount of time that the particles are dynamically mixed and the amount of time that the particles remain static can independently be selected in view of a variety of factors, such as the desired rate at which the gas is produced.

In some examples, after the second amount of time a second amount of dry particles comprising the precursor are provided and the second amount of dry particles comprising the precursor are dynamically mixed with the first amount of the dry particles comprising the precursor and dry particles comprising the proton-generating species for a third amount of time. In some examples, likewise, a third amount of dry particles comprising the precursor can be provided and dynamically mixed. In some examples, the methods can likewise further comprise providing a fourth amount of the dry particles comprising the precursor, or as many additional amounts of dry particles comprising the precursor as are desired.

In some examples, after the second amount of time a second amount of dry particles comprising the proton-generating species are provided and the second amount of dry particles comprising the proton-generating species are dynamically mixed with the first amount of the dry particles comprising the precursor and dry particles comprising the proton-generating species for a third amount of time. In some examples, likewise a third amount of dry particles comprising the proton-generating species can be provided and dynamically mixed. In some examples, the methods can likewise further comprise providing a fourth amount of the dry particles comprising the proton-generating species, or as many additional amounts of dry particles comprising the proton-generating species as are desired.

The third amount of time can be, for example, 1 minute or more (e.g., 5 minutes or more, 10 minutes or more, 15 minutes or more, 30 minutes or more 45 minutes or more, 1 hour or more, 2 hours or more, 3 hours or more 4 hours or more, 6 hours or more, 8 hours or more, 10 hours or more, 12 hours or more, 16 hours or more, or 20 hours or more). In some examples, the third amount of time can be 24 hours or less (e.g., 20 hours or less, 16 hours or less, 12 hours or less, 10 hours or less, 8 hours or less, 6 hours or less, 4 hours or less, 3 hours or less, 2 hours or less, 1 hour or less, 45 minutes or less, 30 minutes or less, 15 minutes or less, 10 minutes or less, or 5 minutes or less). The third amount of time can range from any of the minimum values described above to any of the maximum values described above. For example, the third amount of time can be from 1 minute to 24 hours (e.g., from 1 minute to 1 hour, from 1 hour to 12 hours, from 12 hours to 24 hours, or from 10 minutes to 20 hours).

In some examples, the methods can further comprise milling, crushing, abrading, or a combination thereof the dry particles comprising the precursor and dry particles comprising the proton-generating species. In some examples, milling, crushing, abrading, or a combination thereof the dry particles comprising the precursor and dry particles comprising the proton-generating species can occur during the dynamic mixing. For example, the methods can further comprise dynamically mixing an abrasive particle with the dry particles comprising the precursor and dry particles comprising the proton-generating species. For example, during the reaction between the dry particles comprising the precursor and dry particles comprising the proton-generating species, salt byproduct can form on the surface of the dry particles. The salt byproduct buildup can, in some examples, cease the gas generation before complete conversion of the reactants is obtained. Milling, crushing, abrading, or a combination thereof, the dry particles can scour the surface of the dry particles or crush the dry particles, thereby exposing reactive surfaces and allowing the conversion of the precursor to the gas to continue.

In some examples, the methods can further comprise dynamically mixing a deliquescent with the dry particles comprising the precursor and dry particles comprising the proton-generating species. Examples of deliquescents include, but are not limited to, aluminum chloride, aluminum nitrate, ammonium bifluoride, cadmium nitrate, cesium hydroxide, calcium chloride, calcium iodide, cobalt(II) chloride, gold(III) chloride, iron(III) chloride, iron(III) nitrate, lithium iodide, lithium nitrate, magnesium chloride, magnesium iodide, manganese(II) sulfate, mesoxalic acid, potassium carbonate, potassium oxide, silver perchlorate, sodium formate, sodium nitrate, tachyhydrite, taurocholic acid, tellurium tetrachloride, tin(II) chloride, tin(II) sulfate, yttrium (III) chloride, zinc chloride, and combinations thereof. In some examples, the deliquescent is in the form of a powder. In some examples, the deliquescent can be impregnated in a porous carrier. In some examples, the porous carrier is inert. In some examples, the porous carrier has pores, channels, or the like located therein. In some examples, the porous carrier is uniformly impregnated throughout the volume of the porous carrier via the pores, channels, and the like, with the deliquescent. In some examples, the porous carrier impregnated with the deliquescent is separate from the porous carrier impregnated with the precursor and/or the porous carrier impregnated with the proton-generating species.

In some examples, the methods can further comprise dynamically mixing a desiccant with the dry particles comprising the precursor and dry particles comprising the proton-generating species. Examples of desiccants include, but are not limited to, activated alumina, benzophenone, bentonite clay, calcium oxide, calcium sulfate (Drierite), calcium sulfonate, copper(II) sulfate, lithium chloride, lithium bromide, magnesium sulfate, magnesium perchlorate, molecular sieves, potassium carbonate, potassium hydroxide, silica gel, sodium, sodium chlorate, sodium chloride, sodium hydroxide, sodium sulfate, sucrose, and combinations thereof. In some examples, the desiccant is in the form of a powder. In some examples, the desiccant can be impregnated in a porous carrier. In some examples, the porous carrier is inert. In some examples, the porous carrier has pores, channels, or the like located therein. In some examples, the porous carrier is uniformly impregnated throughout the volume of the porous carrier via the pores, channels, and the like, with the desiccant. In some examples, the porous carrier impregnated with the desiccant is separate from the porous carrier impregnated with the precursor and/or the porous carrier impregnated with the proton-generating species.

In some examples, the methods can further comprise dynamically mixing inert particles with the dry particles comprising the precursor and dry particles comprising the proton-generating species. The inert particles can, for example, comprise porous carrier particles. Exemplary porous carriers include, but are not limited to, silica, pumice, diatomaceous earth, bentonite, clay, porous polymer, alumina, zeolite (e.g., zeolite crystals), or mixtures thereof.

The gas can, for example, be produced at a rate of 1 milliliter per minute (mL/min) or more (e.g., 5 mL/min or more, 10 mL/min or more, 15 mL/min or more, 20 mL/min or more, 30 mL/min or more 40 mL/min or more, 50 mL/min or more, 75 mL/min or more, 100 mL/min or more, 125 mL/min or more, 150 mL/min or more, 200 mL/min or more, 250 mL/min or more, 300 mL/min or more, 350 mL/min or more 400 mL/min or more 450 mL/min or more, 500 mL/min or more, 600 mL/min or more, 700 mL/min or more, 800 mL/min or more, 900 mL/min or more, 1000 mL/min or more, 1250 mL/min or more, 1500 mL/min or more, 1750 mL/min or more, 2000 mL/min or more, 2250 mL/min or more, 2500 mL/min or more, 3000 mL/min or more, 3500 mL/min or more 4000 mL/min or more, or 4500 mL/min or more). In some examples, the gas can be produced at a rate of 5000 mL/min or less (e.g., 4500 mL or less, 4000 mL or less, 3500 mL or less, 3000 mL or less, 2500 mL or less, 2250 mL or less, 2000 mL or less, 1750 mL or less, 1500 mL or less, 1250 mL or less, 1000 mL or less, 900 mL or less, 800 mL or less, 700 mL or less, 600 mL or less, 500 mL or less, 450 mL or less, 400 mL or less, 350 mL or less, 300 mL or less, 250 mL or less, 200 mL or less, 150 mL or less, 125 mL or less, 100 mL or less, 75 mL or less, 50 mL or less, 40 mL or less, 30 mL or less, 20 mL or less, 15 mL or less, 10 mL or less, or 5 mL or less). The rate at which the gas produced can range from any of the minimum values described above to any of the maximum values described above. For example, the gas can be produced at a rate of from 1 mL/min to 5000 mL/min (e.g., from 1 mL/min to 100 mL/min, from 100 mL/min to 1000 mL/min, from 1000 mL/min to 5000 mL/min, or from 10 mL/min to 4000 mL/min).

The average particle size of the dry particles comprising the precursor, the average particle size of the dry particles comprising the proton-generating species, the amount of time the dry particles comprising the precursor and the dry particles comprising the proton-generating species are dynamically mixed, the rate at which the dry particles comprising the precursor and the dry particles comprising the proton-generating species are dynamically mixed, the amount of precursor in the dry particles comprising the precursor, the amount of proton-generating species in the dry particles comprising the proton-generating species, the identity of the precursor, the identity of the proton-generating species, the amount of the dry particles comprising the precursor, the amount of the dry particles comprising the proton-generating species, the type of mixing, the presence and amount of additional components (e.g., inert particles, abrasive particles, deliquesant, desiccant, water, water vapor), or a combination thereof, can be selected to control the total amount of gas produced and/or the rate at which the gas is produced.

In some examples, the gas is chlorine dioxide and 80% or more of the precursor is converted to the gas (e.g., 81% or more, 82% or more, 83% or more, 84% or more, 85% or more, 86% or more, 87% or more, 88% or more, 89% or more, 90% or more, 91% or more, 92% or more, 93% or more, 94% or more, 95% or more, 96% or more, 97% or more, 98% or more, 99% or more, 99.1% or more, 99.2% or more, 99.3% or more, 99.4% or more, 99.5% or more, 99.6% or more, 99.7% or more, 99.8% or more, or 99.9% or more)

In some examples, the gas is carbon dioxide and 1% or more of the precursor is converted to the gas (e.g., 25% or more, 10% or more, 15% or more, 20% or more, 25% or more, 30% or more, 35% or more, 40% or more, 45% or more, 50% or more, 55% or more, 60% or more, 65% or more, or 70% or more). In some examples, the gas is carbon dioxide and 75% or less of the precursor is converted to the gas (e.g., 70% or less, 65% or less, 60% or less, 55% or less, 50% or less, 45% or less, 40% or less, 35% or less, 30% or less, 25% or less, 20% or less, 15% or less, 10% or less, or 5% or less). The amount of precursor that is converted to carbon dioxide gas can range from any of the minimum values described above to any of the maximum values described above. For example, the gas is carbon dioxide and from 1 to 75% of the precursor is converted to the gas (e.g., from 1% to 40%, from 40% to 75%, from 1% to 25%, from 25% to 50%, from 50% to 75%, from 10% to 60%, or from 20% to 75%).

The examples below are intended to further illustrate certain aspects of the methods and compounds described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

As used herein, particles are described as being within a size range, such as 40×80 mesh and 14×30 mesh. This notation is another way of writing −40+80 mesh and −14+30 mesh. In the case of the 40×80 mesh material, this notation means that 90% or more of the material would pass through a 40 mesh sieve (or screen) but would be retained on an 80 mesh sieve. The term "mesh" refers to the size opening in a US Standard sieve.

Example 1

Chlorine dioxide was generated by initially charging and continuously mixing 40 lb. of sodium chlorite impregnated on zeolite (ZC, 40×80 mesh) and 40 lb. of ferric chloride impregnated on zeolite (ZF, 13.6%, 14×30 mesh) in a portable cement mixer (Kobalt 4 cu.ft. Portable Mixer Model #SGY-CMI with polyethylene drum unmodified from factory design). Gaseous chlorine dioxide formed during the mixing of the two solids, and passed out through the opening in the mixer. At several time intervals, samples of the mixed bed of solids were removed and chemically analyzed to determine the remaining unreacted chemical precursor (ZC) content of the bed. The cumulative amount of chlorine dioxide, produced from the beginning of the run to each sample time, was determined by the amount of precursor that had been consumed. A graphical representation of the data is shown in the plot labeled "Cement Mixer" in FIG. 1.

Example 2

Chlorine dioxide was generated by initially charging and continuously mixing 7.5 lb. of ZC (40×80 mesh) and 7.5 lb. of ZF (13.6%, 14×30 mesh) in a vibratory mixer (Chicago Electric 18 Lb. Vibratory Bowl Tumbler with polyethylene bowl modified to plug the drain port). The sampling and analytical procedures to determine chlorine dioxide were identical to those in the Example 1. A graphical representation of the data is shown in the plot labeled "Vibratory Mixer" in FIG. 1.

Example 3

Chlorine dioxide was generated by initially charging and continuously mixing 7.5 lb. of ZC (40×80 mesh) and 7.5 lb. of ZF (13.6%, 14×30 mesh) in a marinator mixer (Inject Star of America variable speed vacuum marinator Model #MC-25). The rotational speed of the marinator mixer is variable from 0.3 RPM to 30 RPM. The marinator mixer unit was modified to use a 5-gallon bucket with an internal mixing blade and run on a 30° inclined angle to contain the media.

The sampling and analytical procedures to determine chlorine dioxide were identical to those in Example 1. A graphical representation of the data is shown in the plots labeled "Marinator Mixer" in FIG. 1.

Example 4

To demonstrate the effect of mixing of ZC and ZF on the production rate of chlorine dioxide in Examples 1-3, an experiment was conducted in the absence of continuous mixing. Initially, 10 grams of ZC (40×30 mesh) and 10 g of ZF (13.6%, 14×30 mesh) were added and sealed within a 2-in by 6-in Tyvek sachet. To begin the experiment, the sachet contents were mixed by vigorous shaking, and the sachet was then suspended over 5% KI solution within a closed 1 qt. canning jar. At regular time intervals, the sachet was removed and placed over fresh 5% KI in other jars without re-mixing the media. This procedure continued for 24 hours. The amount of chlorine dioxide produced was determined by iodometric titration of the KI solutions from each of the jars. A graphical representation of the data is shown in the plot labeled "Sachet" in FIG. 1.

Example 5

Figure 2:
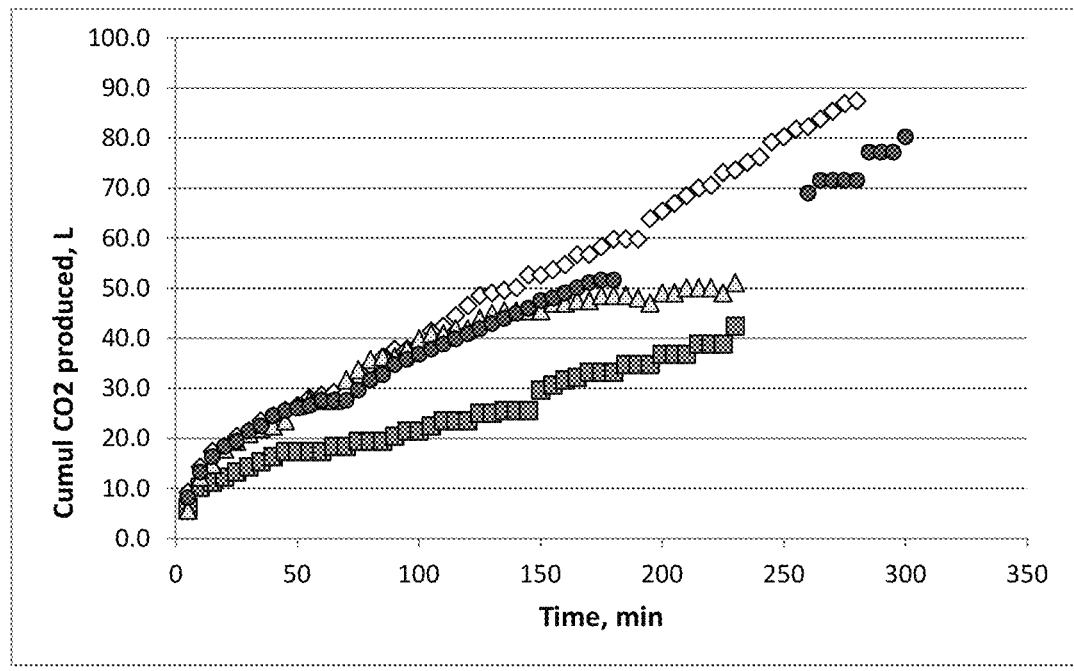
FIG. 2 is a graph of the cumulative amount of carbon dioxide produced over time for four trials using a vibratory mixer.

Carbon dioxide was generated by initially charging and continuously mixing 500 g of sodium bicarbonate (BC) and 900 g of ferric chloride impregnated on diatomaceous earth (DF, diatomaceous earth was Dicalite) in a vibratory mixer. Gaseous carbon dioxide formed during the mixing of the two solids, and passed out through an exit port in the mixer. The cumulative amount of carbon dioxide was monitored in a light-weight, calibrated gas collection bag. A graphical representation of cumulative $CO_2$ versus time is shown in a plot of four similar runs in FIG. 2. The rate of these four runs averaged 198 mL/min with a standard deviation of 66 mL/min.

Example 6

Figure 3:
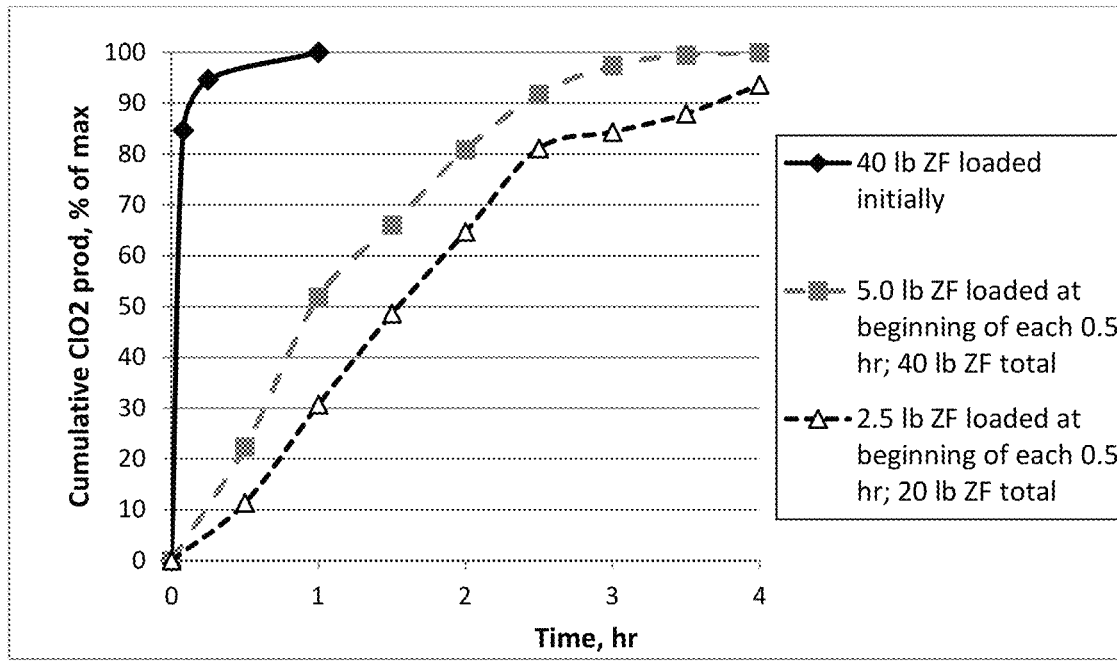
FIG. 3 is a graph of the cumulative chlorine dioxide produced over time using various dynamic mixing strategies.

Chlorine dioxide was generated by initially charging and continuously mixing 40 lb. of ZC (40×80 mesh) in a portable cement mixer. At the beginning of the run, 5 lb. of ZF (13.6%, 14×30 mesh) was added to the mixer. After 0.5 hr of mixing, samples of the bed were removed and analyzed as in Example 1. Immediately after the bed was sampled, a second amount, 5 lb., of ZF was added to the mixer. At 0.5 hr after this ZF addition, the bed was again sampled and analyzed. Immediately after the bed was sampled, a third amount, 5 lb., of ZF was added to the mixer. This intermittent operation of adding ZF and bed sampling was continued for 4 hours. A graphical representation of the data is shown in the plot labeled "5.0 lb. ZF loaded at beginning of each 0.5 hr; 40 lb. ZF total" in FIG. 3. For comparison, the plot labeled "40 lb. ZF loaded initially" in FIG. 3 shows the data for a run in which the total charges of ZC and ZF were added to the mixer initially.

Example 7

Chlorine dioxide was generated in a procedure identical to that of Example 6 with the exception that the amounts of intermittent charges of ZF were 2.5 lb. The data gathered in the run is shown in FIG. 3, labeled "2.5 lb. ZF loaded at beginning of each 0.5 hr; 20 lb. ZF total."

Example 8

Figure 4:
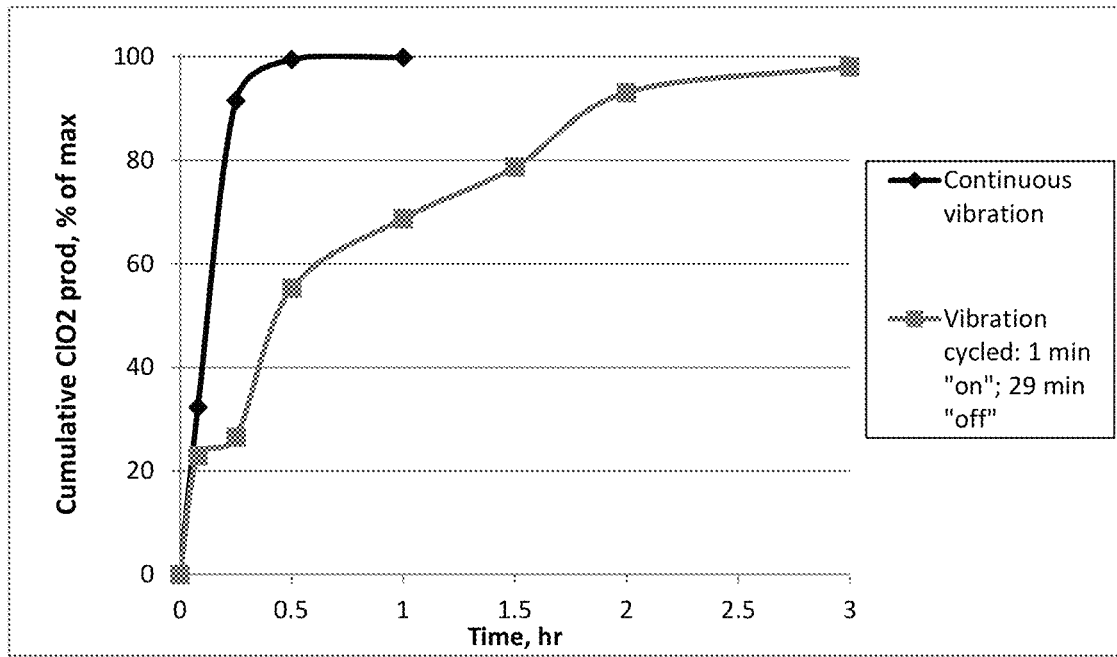
FIG. 4 is a graph of the cumulative chlorine dioxide produced over time using various dynamic mixing strategies.

Chlorine dioxide was generated by initially charging 7.5 lb. of ZC (40×80 mesh) and 7.5 lb. of ZF (13.6%) to a vibratory mixer. The mixer was operated intermittently, by alternately turning the vibration "on" for 1 minute, and turning it "off" for 29 minutes. At the end of each cycle (just prior to turning the mixer "on"), the bed was sampled and contents analyzed as described in previous examples. A graphical representation of the data is shown in FIG. 4. For comparison, a plot of data from an experiment in which vibration was constant throughout is also shown in FIG. 4.

Example 9

$CO_2$ production rate in a vibratory mixer can be controlled using alternating vibration-ON and vibration-OFF cycling, using ratio of time-ON to time-OFF as a control variable. A two-part media system (500 g BC and 900 g DF) was agitated in three sets of experiments, each with a unique ON-OFF cycle over a period of about 8 hours.

In four runs, the vibration cycle was 1 min ON and 14 min OFF for a total of about 500 min. The average cumulative $CO_2$ production for these four runs over 500 min was 28.5 L with a standard deviation of 11.1 L.

In two runs, the vibration cycle was 1 min ON and 29 min OFF. The average cumulative $CO_2$ production for these two runs over 500 min was 27 L with a standard deviation of 9 L.

Figure 5:
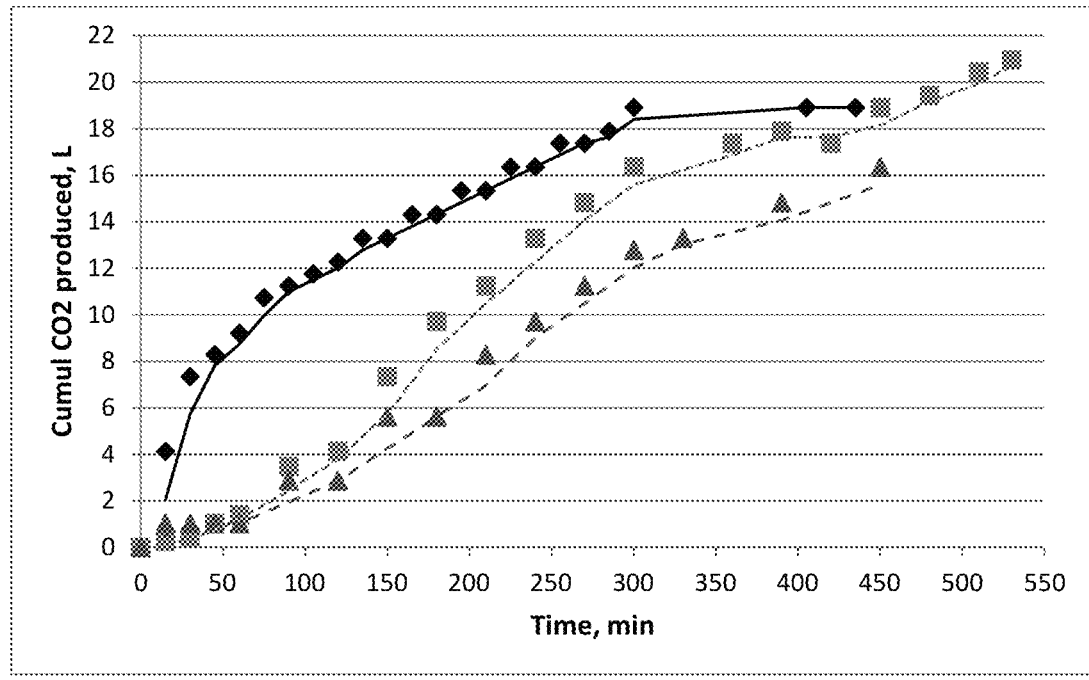
FIG. 5 is a graph of the cumulative carbon dioxide produced over time using pulsed mixing in a vibratory mixer.
Figure 6:
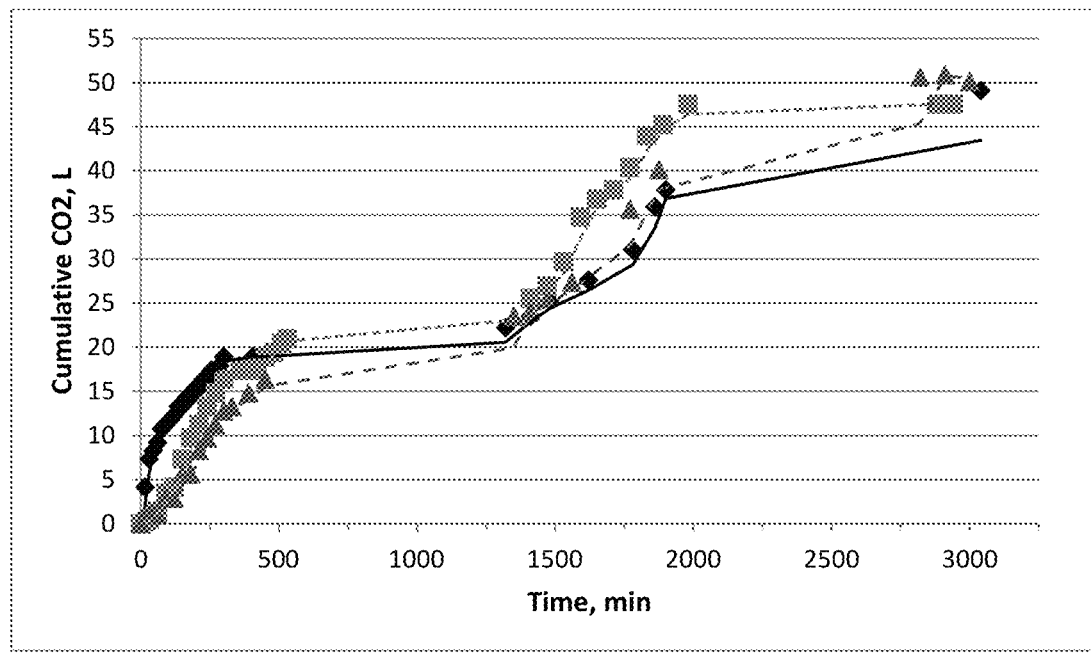
FIG. 6 is a graph of the cumulative carbon dioxide produced over time using pulsed mixing in a vibratory mixer.

In three runs, the vibration cycle was 1 min ON and 59 min OFF (data shown in FIG. 5) over a total period of about 8 hours. The average cumulative $CO_2$ production for these three runs over 500 min was 18.7 L with a standard deviation of 2.5 L. For these three runs, after the 8 hour cycling described above, the vibration was then turned off for a 15 hour period. After the 15 hour OFF period, the vibratory mixer was turned back on and operated for a second 8 hour period as before (1 min ON and 59 min OFF) (data shown in FIG. 6). During the 15 hour off cycle, the average $CO_2$ production was 5 L with a standard deviation of 2 L. During the second 8 hour ON-OFF cycle, the rate of $CO_2$ production resumes at the initial rate and the average $CO_2$ production was 18.2 L with a standard deviation of 3.3 L.

Example 10

The effect of the concentration of the acid in the proton-generating species on the rate of chlorine dioxide gas production mixed in a cement mixer was also investigated. Two trial runs were performed. In the first trial run, chlorine dioxide was generated by initially charging 40 lb. of ZC (40×80 mesh) and 40 lb. of a proton-generating species of a lower acid content, ZF (7%), in a portable cement mixer. The mixer operation, bed sampling and product analysis were identical to those of Example 1.

Figure 7:
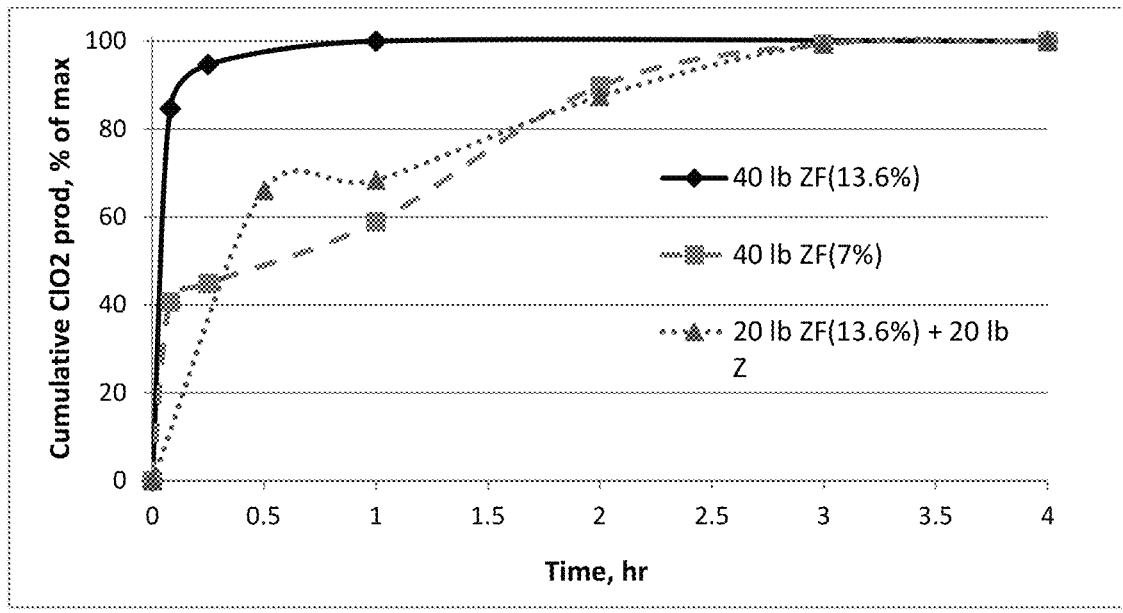
FIG. 7 is a graph of the cumulative chlorine dioxide produced over time using various proton-generating species in a cement mixer.

In the second trial run, chlorine dioxide was generated by initially charging 40 lb. of ZC (40×80 mesh) and 40 lb. of a proton-generating species dilute with an inert solid. The mixer operation, bed sampling and product analysis were identical to those of Example 1. The proton-generating species consisted of 20 lb. ZF (13.6%) and 20 lb. of unimpregnated zeolite (Z). FIG. 7 shows the $ClO_2$ production profile for these two runs in comparison with the undiluted proton-generating species from Example 1.

Example 11

The effect of the concentration of the acid in the proton-generating species on the rate of chlorine dioxide gas production mixed in a vibratory mixer was also investigated. Three trial runs were performed. In the first trial run, chlorine dioxide was generated by initially charging 7.5 lb. of ZC (40×80 mesh) and 7.5 lb. of a proton-generating species of a lower acid content, ZF (7%), to a vibratory mixer. The mixer operation, bed sampling and product analysis were identical to those of Example 2

In the second trial run, chlorine dioxide was generated by initially charging 7.5 lb. of ZC (40×80 mesh) and 7.5 lb. of a proton-generating species diluted with an inert solid. The proton-generating species consisted of 1.9 lb. of ZF (13.6%) and 5.6 lb. of unimpregnated zeolite (Z). The mixer operation, bed sampling and product analysis were identical to those of Example 2.

In the third trial run, chlorine dioxide was generated by initially charging 7.5 lb/of ZC (40×80 mesh) and 7.5 lb. of a proton-generating species of a lower acid content, ZPA (17% phosphoric acid on 14×30 zeolite), to a vibratory mixer. The mixer operation, bed sampling, and product analysis were identical to those of Example 2.

Figure 8:
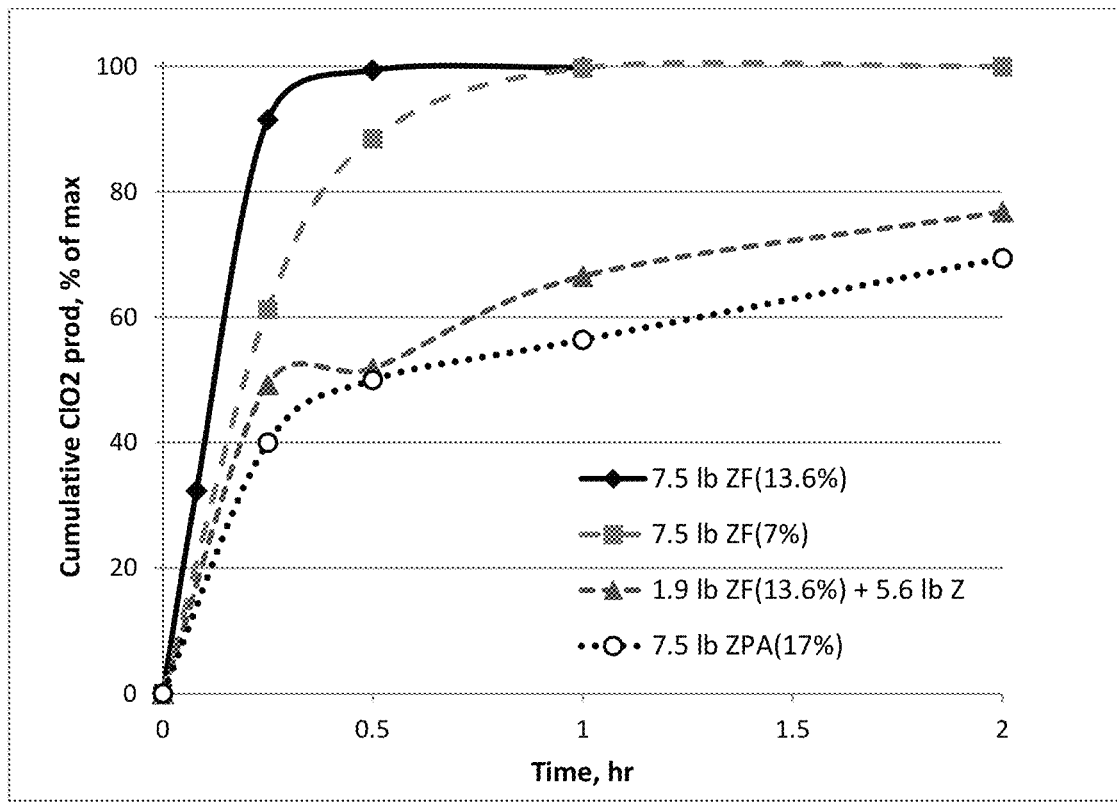
FIG. 8 is a graph of the cumulative chlorine dioxide produced over time using various proton-generating species in a vibratory mixer.

FIG. 8 shows the $ClO_2$ production profile for these three runs in comparison with the undiluted proton-generating species from Example 2.

Example 12

Figure 9:
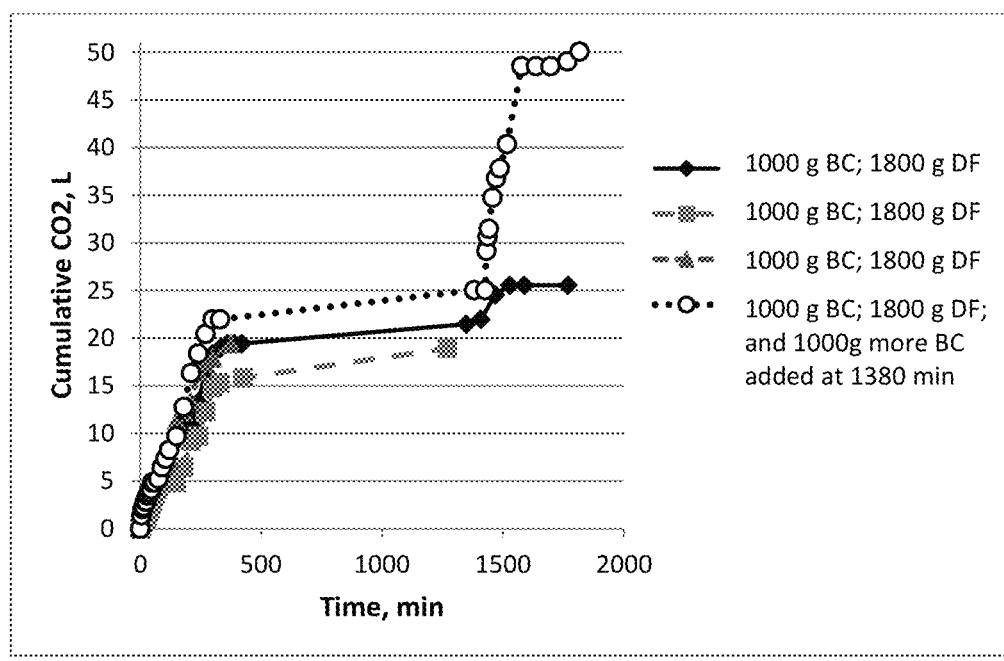
FIG. 9 is a graph of the cumulative carbon dioxide produced over time.

The effect of adding excess precursor on the amount of carbon dioxide produces was also investigated. FIG. 9 shows in three runs where a two part media (1000 g BC and 1800 g DF) was added initially in stoichiometric proportion to a vibratory mixer produced only 10% of the stoichiometric amount of $CO_2$ within about 500 minutes. For the fourth run, additional sodium bicarbonate was added at 1350 min to bring the level in the reactor to 200% of stoichiometric, and the production of $CO_2$ doubled in that run.

The compositions and methods of the appended claims are not limited in scope by the specific compositions and methods described herein, which are intended as illustrations of a few aspects of the claims and any compositions and methods that are functionally equivalent are within the scope of this disclosure. Various modifications of the compositions and methods in addition to those shown and described herein are intended to fall within the scope of the appended claims. Further, while only certain representative compositions and methods, and aspects of these compositions and methods are specifically described, other compositions and methods and combinations of various features of the compositions and methods are intended to fall within the scope of the appended claims, even if not specifically recited. Thus, a combination of steps, elements, components, or constituents can be explicitly mentioned herein; however, all other combinations of steps, elements, components, and constituents are included, even though not explicitly stated.

What is claimed is:

1. A method of producing a gas, the method comprising:
   dynamically mixing dry particles comprising a precursor and dry particles comprising a proton-generating species to produce the gas;
   wherein the dry particles comprising the precursor and the dry particles comprising the proton-generating species are dynamically mixed for a first amount of time, after which the dry particles comprising the precursor and the dry particles comprising the proton-generating species are static for a second amount of time, and after the second amount of time the dry particles comprising the precursor and the dry particles comprising the proton-generating species are dynamically mixed for a third amount of time;
   wherein the gas is produced at a rate that is controlled by controlling the first amount of time for which the dry particles comprising the precursor and the dry particles comprising the proton-generating species are dynamically mixed, the second amount of time for which the dry particles comprising the precursor and the dry particles comprising the proton-generating species are static, and the third amount of time for which the dry particles comprising the precursor and the dry particles comprising the proton-generating species are dynamically mixed;
   wherein the dry precursor particles comprise a chlorine dioxide precursor and the gas comprises chlorine dioxide; the dry precursor particles comprise a carbon dioxide precursor and the gas comprises carbon dioxide; or a combination thereof; and
   wherein when the gas is chlorine dioxide 80% or more of the precursor is converted to the gas.

2. The method of claim 1, wherein the chlorine dioxide precursor comprises a chlorine dioxide-producing compound selected from the group consisting of a metal chlorite, a metal chlorate, chloric acid, hypochlorous acid, and combinations thereof.

3. The method of claim 1, wherein:
   the dry particles comprising the precursor further comprise a porous carrier selected from the group consisting of zeolite crystals, silica, pumice, diatomaceous earth, bentonite, and clay, and the precursor is impregnated in the porous carrier;
   the dry particles comprising the proton-generating species further comprise a porous carrier selected from the group consisting of zeolite crystals, silica, pumice, diatomaceous earth, bentonite, and clay, and the proton-generating species is impregnated in the porous carrier; or
   a combination thereof.

4. The method of claim 1, wherein the dry particles comprising the precursor include from 1% to 50% by weight of the precursor, wherein the dry particles comprising the proton-generating species include from 1% to 50% by weight of the proton-generating species, or a combination thereof.

5. The method of claim 1, wherein the proton-generating species comprises an organic acid and/or an inorganic acid selected from the group consisting of acetic acid, citric acid, hydrochloric acid, phosphoric acid, propionic acid, sulfuric acid, and combinations thereof.

6. The method of claim 1, wherein the proton-generating species comprises a metal salt selected from the group consisting of ferric chloride, ferric sulfate, $CaCl_2$, $ZnSO_4$, $ZnCl_2$, $CoSO_4$, $CoCl_2$, $MnSO_4$, $MnCl_2$, $CuSO_4$, $CuCl_2$, $MgSO_4$, sodium acetate, sodium citrate, sodium sulfate, sodium bisulfate, hydrogen phosphate, disodium hydrogen phosphate, and combinations thereof.

7. The method of claim 1, wherein the dry particles comprising the precursor and dry particles comprising the proton-generating species are dynamically mixed in a mixer selected from the group consisting of a tumbler, a vibratory mixer, a rotary mixer, a marinator mixer, and a stirrer.

8. The method of claim 1, wherein after the second amount of time a second amount of dry particles comprising the precursor are provided and the second amount of dry particles comprising the precursor are dynamically mixed with the first amount of the dry particles comprising the precursor and dry particles comprising the proton-generating species for the third amount of time, and wherein the rate at which the gas is produced is further controlled by controlling the second amount of dry particles comprising the precursor.

9. The method of claim 1, wherein after the second amount of time a second amount of dry particles comprising the proton-generating species are provided and the second amount of dry particles comprising the proton-generating species are dynamically mixed with the first amount of the dry particles comprising the precursor and dry particles comprising the proton-generating species for the third amount of time, and wherein the rate at which the gas is produced is further controlled by controlling the second amount of dry particles comprising the proton-generating species.

10. The method of claim 1, further comprising milling, crushing, abrading, or a combination thereof the dry particles comprising the precursor and dry particles comprising the proton-generating species.

11. The method of claim 1, further comprising dynamically mixing an abrasive particle, a deliquescent, a desiccant, or a combination thereof with the dry particles comprising the precursor and dry particles comprising the proton-generating species.

12. The method of claim 1, wherein the rate at which the gas is produced is further controlled by controlling the rate at which the dry particles comprising the precursor and the dry particles comprising the proton-generating species are dynamically mixed during the first amount of time.

13. The method of claim 1, wherein the rate at which the gas is produced is further controlled by controlling the rate at which the dry particles comprising the precursor and the dry particles comprising the proton-generating species are dynamically mixed during the third amount of time.

* * * * *